United States Patent [19]

Chitjian

[11] Patent Number: 4,855,004
[45] Date of Patent: Aug. 8, 1989

[54] SEAM WELDING MACHINE FOR THERMOPLASTIC MATERIAL

[75] Inventor: John R. Chitjian, Long Grove, Ill.

[73] Assignee: Clements National Company, Chicago, Ill.

[21] Appl. No.: 66,522

[22] Filed: Jun. 26, 1987

[51] Int. Cl.⁴ .................. B32B 31/08; B32B 31/12; B32B 31/26

[52] U.S. Cl. .................. 156/359; 156/499; 156/497; 156/574; 156/578; 156/579

[58] Field of Search ......... 156/497, 499, 359, 304.4, 156/304.5, 304.7, 526, 574, 578, 579; 126/411, 227; 248/182; 239/570

[56] References Cited

U.S. PATENT DOCUMENTS

| | | | |
|---|---|---|---|
| 3,279,971 | 10/1966 | Gardener | 156/304.5 X |
| 3,853,669 | 12/1974 | Werstlein | |
| 3,934,377 | 1/1976 | Tertinek | 51/177 |
| 3,962,016 | 6/1976 | Alfter et al. | |
| 4,019,946 | 4/1977 | Greisman | |
| 4,094,725 | 6/1978 | Takeda et al. | 156/497 |
| 4,171,800 | 10/1979 | Weaver | 248/182 X |
| 4,239,581 | 12/1980 | Lang | 156/497 |
| 4,260,439 | 4/1981 | Speer | |
| 4,315,791 | 2/1982 | Ishii et al. | |
| 4,354,893 | 10/1982 | Kugler et al. | 156/497 |
| 4,440,588 | 4/1984 | Stevenson et al. | |
| 4,445,955 | 5/1984 | Struve | |
| 4,447,288 | 5/1984 | Seaman | |
| 4,452,654 | 6/1984 | KaDell, Jr. | 248/182 X |
| 4,504,352 | 3/1985 | Meyer | 156/499 |
| 4,673,073 | 6/1987 | Weatherby | 192/105 BA |
| 4,743,332 | 5/1988 | Black | 156/499 |

OTHER PUBLICATIONS

Brochure entitled "CompuWelder".
Brochure Showing Leister-Variant features.

*Primary Examiner*—David Simmons
*Assistant Examiner*—Jeff H. Aftergut
*Attorney, Agent, or Firm*—Hill, Van Santen, Steadman & Simpson

[57] ABSTRACT

An automatic seam welder for thermoplastic material includes a single piece frame riding on two drive wheels and a caster, the drive wheels being driven by a drive motor through a helical spring clutch. A heat gun is gimbal mounted to the frame and includes a blower, heating element, and shaped foot to direct hot air between overlapped thermoplastic sheets. A thermocouple in the foot directly senses the air temperatue and, through a control circuit in a control instrument enclosure, is used to control power to the heater element. A guide wheel, foot rest and air dam are also provided.

20 Claims, 4 Drawing Sheets

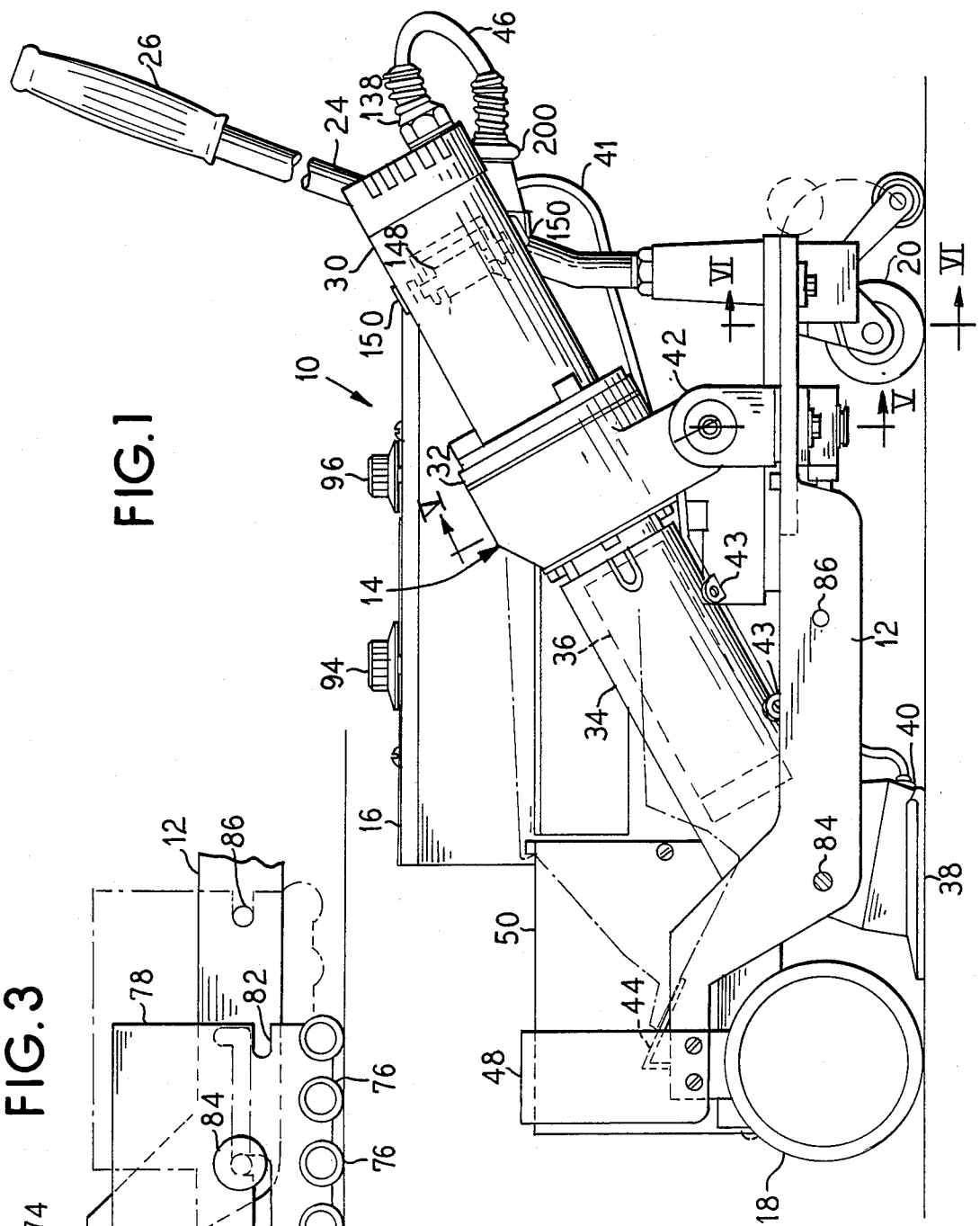
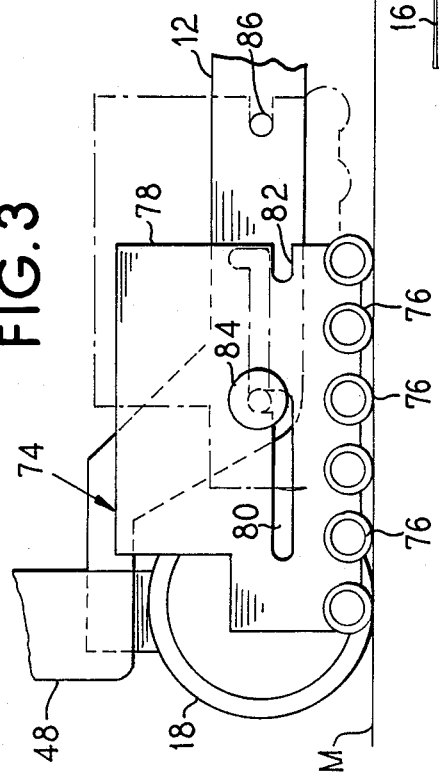

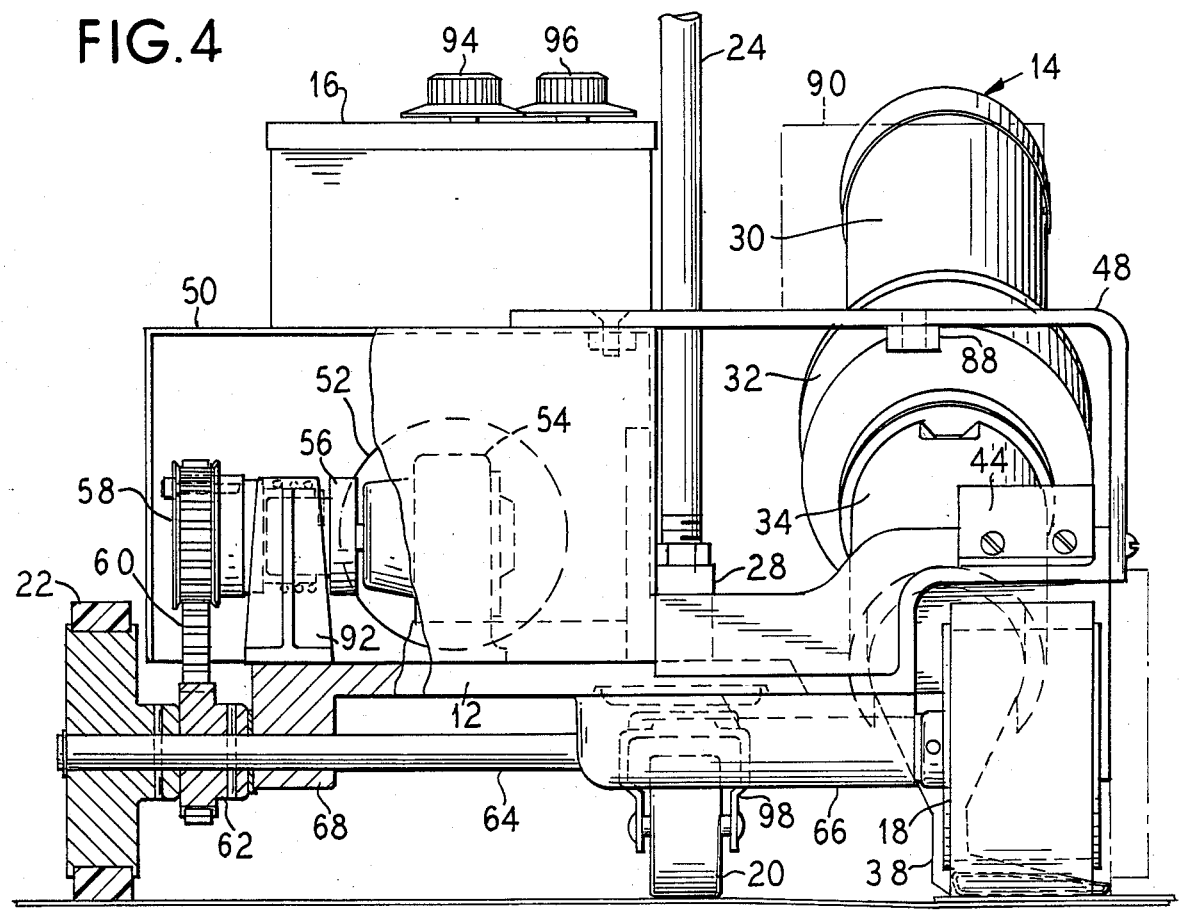
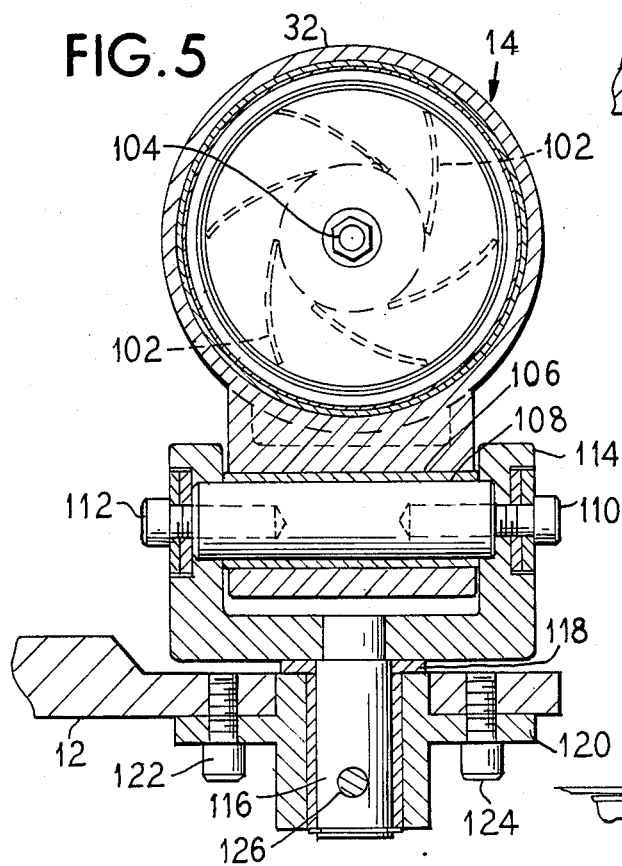
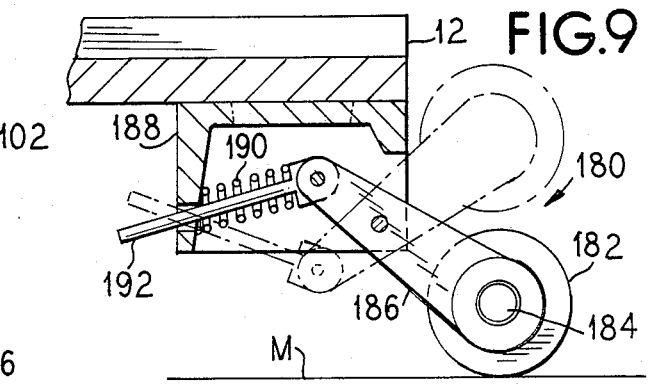
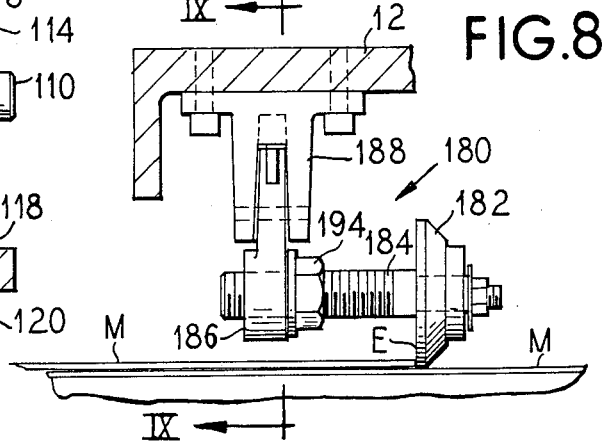

SEAM WELDING MACHINE FOR THERMOPLASTIC MATERIAL

BACKGROUND OF THE INVENTION

1. Field of the Invention

The present invention relates generally to an apparatus for thermal welding of overlapped sheeting, and more particularly, to a self-propelled machine for welding thermoplastic sheet material by the application of heated air.

2. Description of the Related Art

The use of thermoplastic roofing material in sheet form has become increasingly popular. Such roofing material, which is generally of PVC plastic or the like, is laid on a roof from rolls of the material. Adjoining edges of the sheet material are overlapped and welded by the application of heat to provide watertight seams. The resulting roof offers durable long-lasting protection at relatively little expense and with little maintenance.

Various devices are known for welding the overlapped seams of thermoplastic material. One example of a seam welding device is disclosed in Stevenson et al. U.S. Pat. No. 4,440,588 entitled "Hot Air Welder for Welding Roofing Material". The disclosed apparatus includes a blower communicating with a heater assembly mounted on a chassis which includes a pressure wheel and a tracking wheel. The welder accommodates inside and outside seams and has an air dam. A constant speed blower controlled by a gate valve controls the amount of air to the heater assembly. An alarm is provided for sensing insufficient temperature of the heater during operation of the welder.

SUMMARY OF THE INVENTION

The present invention provides accurate temperature control, durability, and speed in a automatic seam welder which is simple to maintain and repair. The present automatic seam welder is easily guided along the overlapped edges of the thermoplastic sheet material, while substantially reducing the possibility of overheating, and the resulting damage, to the thermoplastic sheet material. Finally, the device is easy to use, heats fast without regard to environmental temperature, and insures a good seal between the overlapped roofing material.

The automatic seam welder apparatus of the present invention is mounted on a one-piece frame to ensure rigidity and durability. In a preferred embodiment, the frame is of cast aluminum for lightness and simplicity during manufacturing. The one-piece frame is mounted on three wheels, two of which are driven by a DC motor through a toothed belt and helical spring clutch. One of the two driven wheels is a wide pressure roller which rides over the seam to be welded to ensure a complete seal. A mounting for additional weights is provided on the frame over the pressure roller wheel to further ensure complete welds. The third wheel is a double caster mounted at the front of the device for easy tracking along the seam of the overlapped sheets, such as sheets of roofing material. A guide roller is preferably provided toggle mounted on the front of the frame to aid in following the seam.

A heat gun is gimbal mounted on the frame, the gimbal including a detent position indicator to insure accurate alignment of the heat gun relative to the pressure roller wheel. The heat gun is a single unit that includes the blower motor, the blower, and the heating element which together direct a stream of heated air to a shaped foot which extends between the overlapped portions of the roofing material. A thermocouple temperature sensor is mounted within the shaped foot, to insure accurate temperature control without the evironmental temperature significantly effecting the output temperature. The heat gun is pivotable on the gimbal into a non-operative position with the shaped foot lying on a foot rest mounted on the frame. The foot rest includes markings to aid in adjusting the alignment and distance of the foot from the pressure roller wheel.

The present device includes a modular control unit also mounted on the frame which includes control circuitry for pulsing power to the heating element in response to the temperature sensed by the thermocouple. Controls are mounted on the top of the modular control unit for easy access. All connectors between the control unit and the heat gun are of the quick-connect type so that either the control unit and/or the heat gun can be changed out quickly at the job site to reduce down time and thereby avoid expensive delays during use. Additional features include the provision of an optional air dam, and the use of removable brush caps for quick change of worn brushes in both the blower motor and the drive motor.

Although described herein as for use in welding seams of roofing material, the present automatic seam welder can be used with swimming pool liners, setting pond liners, tarpaulins, inflatable structures, and indeed on any thermoplastic resin sheeting that is heat weldable.

BRIEF DESCRIPTION OF THE DRAWINGS

FIG. 1 is a side elevational view showing an automatic seam welding apparatus according to the principles of the present invention;

FIG. 3 is a fragmentary side elevational view showing an air dam in use on the present device;

FIG. 4 is an end elevational view of the present automatic seam welder taken from the left with respect to FIG. 1;

FIG. 5 is a cross section along line V—V of FIG. 1 through the blower and gimbal mount;

FIG. 8 is a cross section along line VIII—VIII of FIG. 1 showing a guide roller; and FIG. 9 is a cross section along line IX—IX of FIG. 8 showing a toggle mount for the guide roller in two alternate positions.

DESCRIPTION OF THE PREFERRED EMBODIMENTS

Figure 2:
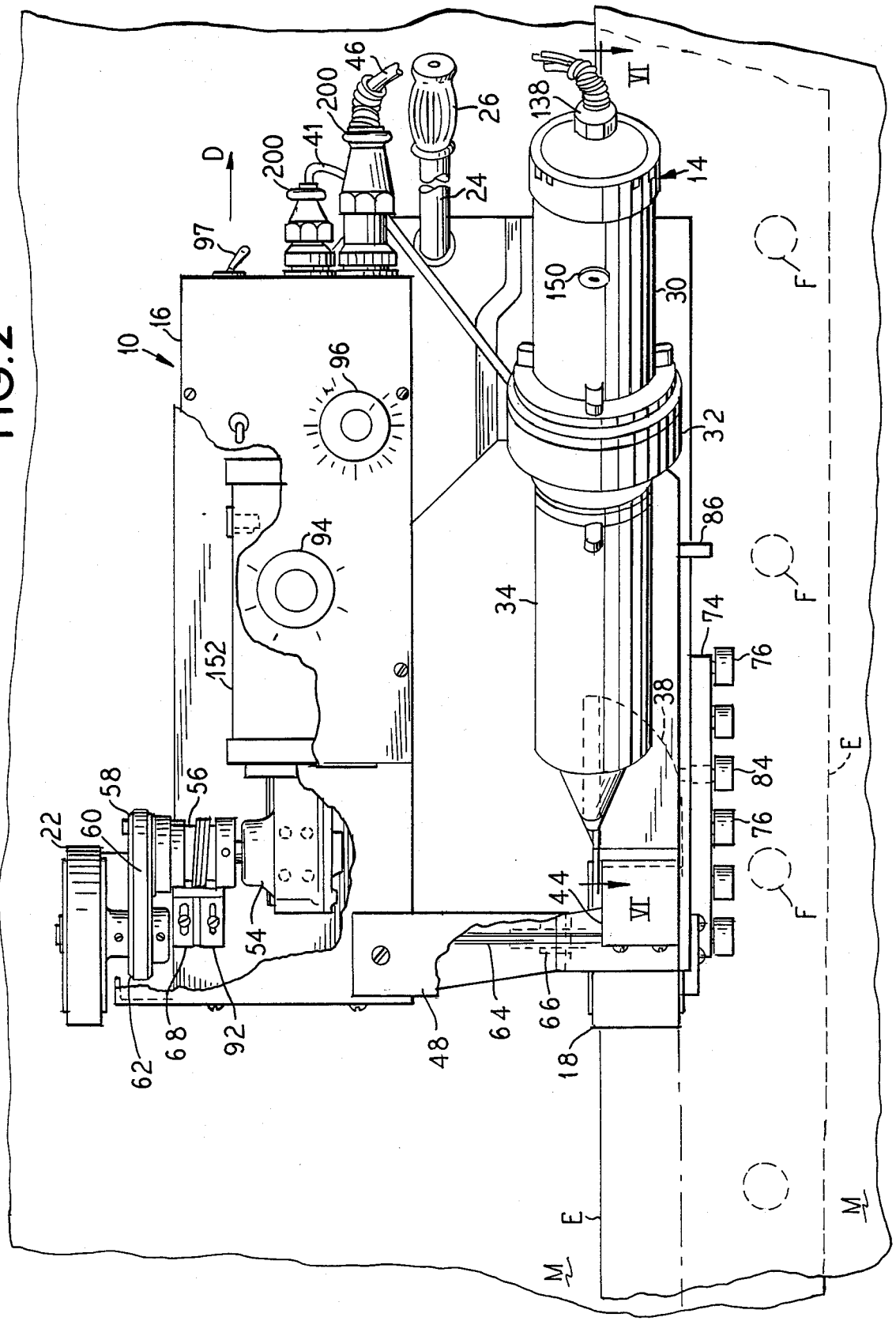
FIG. 2 is a plan view of the automatic seam welding apparatus of FIG. 1 shown welding a seam of thermoplastic material.

In FIG. 1 is shown a seam welding machine 10 of the present invention. The seam welding machine 10 includes a frame 12, a heat gun assembly 14, and an instrument enclosure 16. The frame 12, which in a preferred embodiment is a one-piece frame of cast aluminum, rides on a set of three wheels 18, 20, and 22, wheel 22 being behind wheel 18 in FIG. 1. Extending generally upward from the frame or chassis 12 is a guide handle 24 at the end of which is a grip 26. In the preferred embodiment, the guide handle is of aluminum rod 24 and is mounted to a threaded boss on the chassis 12.

The heat gun assembly 14 of the present invention includes a motor housing portion 30 mounted to one side of an impeller housing 32, at the other side of which is mounted a nozzle body 34. Within the nozzle body 34 is a heating element assembly 36. At the lower end of the nozzle body 34 is a shaped nozzle foot 38 having mounted therein a thermocouple 40. The thermocouple 40 preferably extends into the air stream which flows through the nozzle foot 38. The thermocouple 40 is electrically connected to circuitry within the instrument enclosure 16 by a thermocouple cable 41 (see FIG. 6), which is shown affixed to the heat gun 14 by cable clips 43. The entire heat gun assembly 14 is mounted to the chassis or frame 12 by a gimbal mount 42 so that the heat gun assembly 14 may be pivoted between an operative position as shown in solid outline in FIG. 1, and an inoperative position as shown in phantom. When the heat gun assembly 14 is in the inoperative position, the nozzle foot 38 rests on a foot rest 44 secured to the chassis 12. Control and power connections between the heat gun 14 and the instrument enclosure 16 are provided by a multiconductor cable 46.

Also secured to the chassis 12 over the wheel 18 is a ballast support bracket 48. One side of the ballast support bracket is supported by a cover 50 for a drive assembly of the seam welding machine 10.

With reference to FIG. 2, the seam welding machine 10 is shown welding a seam S to join two sheets of roofing material M. The device 10 is driven in a forward direction indicated by arrow D by a drive motor 52 which is preferably a permanent magnet-type DC motor. The output of the drive motor 52 is connected through a transmission 54 to a helical spring clutch 56. The output of the clutch 56 turns a driver pulley 58 over which extends a timing belt 60 linked to a driven pulley 62. The driven pulley 62 turns a drive axle 64 extending between the wheels 22 and 18. The axle 64 is mounted for rotation on a pair of flanged bearings 66 and 68. As can be seen, the first rear wheel 18 is wider than the second rear wheel 22, since the first rear wheel 18 acts as a pressure roller wheel in addition to being a drive wheel. The wheel 18 of an exemplary embodiment is of stainless steel with an outer surface of heat resistant silicon rubber, since the wheel 18 follows immediately after the nozzle foot 38.

The drive motor 52, thus, operates to drive the two rear wheels 18 and 22 to move the present device 10 in the forward direction D. As the device 10 moves forward, it is guided by manipulation of the guide handle 24 along an edge E of the overlapped roofing material M to form the seam S. As the welding machine 10 is guided along the edge E, the nozzle foot 38 extends between the overlapped portions of the roofing material M and directs a stream of heated air therebetween. The heated air causes controlled thermoplastic melting of the roofing material M; after which the pressure roller wheel 18 rolls over the heated roofing material portions to seal the seam S and thereby insure a long-lasting and watertight weld between the two sheets of roofing material M. As shown in phantom, the lower sheet of roofing material M is fastened to the roof by spaced fasteners F, and the top roofing sheet M is overlapped and sealed behind the fasteners F. This insures that no fasteners F extend through exposed portions of the finished roof thereby avoiding leakage.

To prevent the top roofing sheet M from blowing upward as the heated air stream is directed thereunder, an air dam 74 is mounted on the side of the frame 12 between the nozzle foot 38 which underlies the edge E of the top roofing sheet M and the balance of the roofing sheet M. The air dam 74, which can be seen in greater detail in FIG. 3, includes a plurality of rollers 76 which ride on the surface of the top roofing sheet M. The air dam 74 is formed of a plate 78, such as of brass, that includes a closed slot 80 and an open-ended slot 82 for engaging respective mounting pins 84 and 86 extending from the frame 12. The slot 80 has an L-configuration in the illustrated embodiment so that the pin 84 rides in the upper end of the L slot 80 with the rollers 76 resting on the surface of the roofing material M during use of the air dam 74. The single pin mounting enables the air dam 74 to pivot about the pin 84 to accomodate irregularities in the roof. The pin 84 rides in the lower arm of the L slot 80, as shown in phantom, while the open slot 82 engages the pin 86 to hold the air dam 74 off of the roofing material M when not in use. The pin 84 can be a threaded bolt which selectively locks the air dam 74 in the up-position.

In the end view of FIG. 4, the wheel 18 is aligned with the nozzle foot 38 of the heat gun assembly 14. The gimbal mounted heat gun assembly 14 enables the entire assembly 14 to be pivoted so that the nozzle foot 38 can be raised to rest on rest the foot rest 44 mounted on the chassis 12 above the wheel 18. During use of the present device, the heat gun assembly 14 is pivoted from the foot rest 44 so that the foot 38 extends between the overlapped sheets M. The pressure roller wheel 18 follows the foot 38 and presses down on the overlapped roofing layers to insure a watertight weld. For added weight on the wheel 18, the ballast support bracket 48 is mounted over the wheel 18 and includes a fastening means 88 to which may be fastened a ballast weight 90 as shown in phantom.

The ballast support bracket 48 is fastened at its other end to the drive cover 50 within which is mounted the drive motor 52, the transmission 54, and the helical spring clutch 56. Mounted to the chassis 12 within the drive housing 50 is a clutch tang retaining bracket 92 which engages a tang portion of the helical spring on the clutch 56.

The control instrument enclosure 16 mounted above the drive housing 50 includes a pair of top mounted control knobs 94 and 96 for adjusting the speed and temperature, respectively, of the seam welder 10. Thus, the knob 94 is a manually operable continously adjustable motor drive speed control for effecting selective adjustment of the speed of the drive motor 52. Also mounted on the enclosure 16 is an on/off circuit breaker switch 97 shown in FIG. 2. Within the control instrument enclosure 16 is a solid state relay through which electrical power is supplied to the heating element assembly 36, as well as circuit boards for the temperature and speed control circuitry.

Shown at the bottom of FIG. 4 is the third wheel 20 which is mounted by a caster bracket 98 to the underside of the chassis or frame 12 in alignment with the guide handle 24. Thus, the two driven wheels 18 and 22, in combination with the caster wheel 20 in alignment with the guide handle 24, enable the unit 10 to be guided easily, such as along an edge of overlapped roofing material. In a preferred embodiment, the caster wheel 20 is a double caster.

In a cross-sectional view of the heat gun assembly 14 shown in FIG. 5 can be seen an impeller housing 32 having impeller blades 102 rotationally mounted therewithin on a motor shaft 104. The impeller housing 32 includes a bushing 106 through which extends a heat gun mounting shaft 108. The heat gun mounting shaft 108 is connected by a pair of bolts 110 and 112 between the arms of a yoke 114. The yoke 114 includes a yoke pivot shaft 116 vertically disposed therebeneath; the yoke pivot shaft 116 extending through a bushing 118 into a mounting bracket 120. The mounting bracket 120 is affixed to the chassis 12, such as by bolts 122 and 124. A detent recess 126 is preferably formed on the yoke pivot shaft 116.

Figures 6, 7:
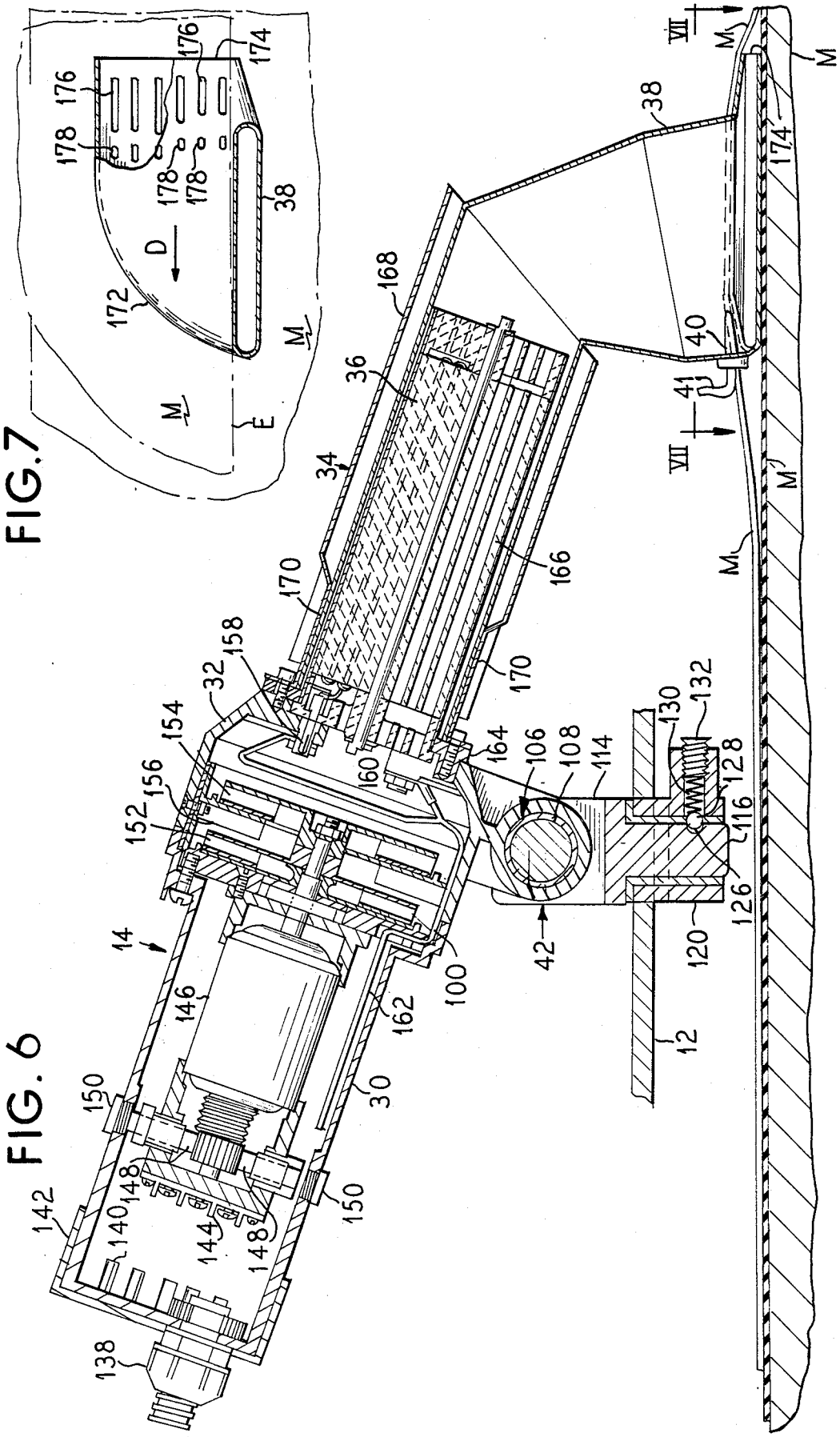
FIG. 6 is a cross section along line VI—VI of FIG. 2 showing the heat gun assembly and gimbal mount.
FIG. 7 is a cross section along line VII—VII of FIG. 6 showing the nozzle foot between overlapped thermosplatic sheets.

Referring now to FIG. 6, the heat gun assembly 14 is mounted on the gimbal 42 formed by the yoke 114 held in the mounting bracket 120. The mounting bracket 120 includes a ball 128 biased by a spring 130 to engage the detent recess 126 in the yoke pivot shaft 116. The spring 130 is held in the mounting bracket 120 by a set screw 132. In this way, the gimbal 42 is provided with a detent position to ensure alignment of the nozzle foot 38 with the wheel 18.

Beginning at the upper left end of the heat gun assembly 14 with respect to FIG. 6, a fitting 138 provides an electrical connection between the heat gun assembly 14 and the instrument enclosure 16. The fitting 138 is mounted in an end of the heat gun assembly 14 which includes slotted air inlets 140, over which is provided an air control damper cap 142 which is manipulated to vary the air flow into the heat gun assembly 14. A terminal strip 144 provides a connection site for electrical wiring (not shown) from the fitting 138. The terminal strip 144 is mounted to a blower motor 146 mounted within the blower housing 30, the blower motor 146 preferably being a 230 volt universal motor. Brushes 148 for the motor 146 are accessible from outside the blower motor housing 30 through brush caps 150 for simplified maintenance. The motor shaft 104 of the blower motor 146 is connected to an inner impeller housing 100 within the impeller housing 32; the inner impeller housing 100 including impellers 152 and 154, between which is provided air straightener fins 156. Both the blower housing 30 and the impeller housing 32 in a preferred embodiment are of a plastic material for light weight and durability.

The heating element assembly 36 is mounted downstream of the two-stage impeller housing 32 within the nozzle body 34. Electrical power is supplied to the heating element assembly 36 through terminal pins 158 and 160 connected to heating supply leads 162 which are likewise connected through the fitting 138.

Thermal insulation between the heater nozzle body 34, which is preferably of stainless steel, and the plastic impeller housing 32 is provided by a mica spacer gasket 164. A mica insulating sleeve 166 is also preferably provided about the heater element assembly 36. To insure safety of users of the present device, a heat shield 168 extends about the nozzle body 34, and is welded thereto at recesses 170.

At the output end of the heater nozzle 34 is connected the nozzle foot 38, also of stainless steel, the thermal couple 40 being mounted in the heel of the nozzle foot 38 to directly sense the temperature of air passing therethrough. The nozzle foot 38 has a generally flattened outlet nozzle portion 172 with an end facing nozzle opening 174 through which the heated air is directed between the roofing material sheets M.

With reference to FIG. 7, the shaped outlet nozzle 172 is shown extending beneath overlapped edges E of roofing sheets M. In addition to the end facing nozzle opening 174, the outlet nozzle 172 includes air slots 176 of varying dimensions across the width of the outlet nozzle and spaced from the end thereof. A raised embossment 178 is provided on the upper and lower surfaces of the outlet nozzle 172 at each of the slots 176 in the direction D of the apparatus 10 to slightly lift the roofing sheets M away from the air slots 176 and thereby prevent charring. The air slots, thus, provide preheating air to the thermoplastic roofing material M prior to encountering the direct heated air stream from the nozzle opening 174. The air slots 176, as well as the raised embossment 178, are provided both on the upper and lower surfaces of the outlet nozzle 172.

In FIG. 8, a guide wheel assembly 180 is shown including a guide wheel 182 mounted on an axle 184, which in turn connects to a lever 186. The lever is pivotably mounted in a mounting bracket 188 for movement between first and second positions as shown in FIGS. 1 and 9. In a preferred embodiment, the guide wheel assembly 180 is toggle-mounted, such as by a toggle spring 190 shown in FIG. 9 which encircles a spring stem 192 mounted at an over-center end of the lever 186. As can be seen in FIG. 8, the guide wheel 182 is aligned with an edge E of the overlapped roof sheeting M so that the seam welder 10 can be accurately guided to provide the welded seam S. Adjustment of the guide wheel 182, in the illustrated embodiment, is by a threaded connection 194 on the guide wheel axle 184.

Since not only is rotational alignment of the nozzle foot 38 with the wheel 18 critical in obtaining a watertight weld, but the distance between the outlet opening 174 of the outlet nozzle 172 from the wheel 18 is significant as well. If the outlet nozzle 174 is too close to the wheel 118, charring of the thermoplastic roof material M occurs. On the other hand, if the outlet opening 174 is too far from the wheel 18, then the thermoplastic roof material M has a chance to cool before being pressed together by the wheel 18 and an incomplete weld seam S occurs. Therefore, the preferred embodiment of the present invention includes distance markings on the foot rest 44 by which the displacement of the nozzle foot 38 can be adjusted, such as by the bolts 122 and 124 riding in slots in the chassis 12. Such markings can also be used to insure proper angular alignment of the nozzle 38, as well.

The preferred embodiment also includes quick-connect fittings 200 as shown in FIG. 2 for the cabling 46 between the heat gun assembly 14 and the instrument enclosure 16. The instrument enclosure 16, as well as the heat gun assembly 14, can be readily removed from the chassis 12 for quick replacement, and the quick-connect plug connections 200 facilitate this speedy removal and replacement.

The three-wheeled support of the present device provides for stability on uneven roofing surfaces, while the caster 20 and guide roller arrangement 180 assure easy alignment with the edge E of the roofing material M.

The presence of the thermocouple 40 mounted in the nozzle foot 38 ensures that direct and accurate temperature measurement of the output air flow is made for improved accuracy without environmental temperature effects. The thermocouple 40, operating through a control circuit within the instrument housing 16, pulses electrical power to the heating element assembly 36 by way of a time proportioned circuit in the instrument enclosure 16 so that temperature, in a preferred embodiment, is maintained at a predetermined temperature, +2° F. In one embodiment, the control circuit provides for a minimum 0.4 second on/off time for the pulse cycling.

The accurate temperature control avoids the possibility of damage to the thermoplastic material M from overheating so that little or no timely patching procedures are required. The thermocouple also provides for quick start-up, and in one embodiment, the unit 10 is ready for use within one minute of a cold start. The accurate temperature control also increases welding speeds, and in one example, welding speeds of over 30 feet per minute are possible.

Maintenance for the present device is simplified and down time is reduced by the provision of brush caps on both the DC drive motor and the universal blower motor. In addition, the modular design allows repair of the present unit to reduce expensive idle time by a work crew. A circuit breaker is also included in the control circuitry or the device. In addition to its ease of use and maintenance, the disclosed seam welder has a rigid one-piece frame incorporating aluminum and plastic structural components for reduced weight. In a prototype model, the entire unit weighs approximately 30 lbs.

The present welder 10 is disclosed as for use with left hand overlapped roofing. It is, of course, possible that it may be provided for use with right hand overlapped roofing, although roofing rolls are becoming standardized for left hand overlapping.

Thus, there is provided an automatic seam welder for efficiently welding watertight seams in thermoplastic material, such unit being easy to use, fast, durable, and easily repaired.

Although other modifications and changes may be suggested by those skilled in the art, it is the intention of the inventor to embody within the patent warranted hereon all changes and modifications as reasonably and properly come within the scope of his contribution to the art.

I claim:

1. A seam welding apparatus for welding overlapped thermoplastic sheeting with a substantially flat seam, comprising:
   a wheel mounted frame having a plurality of wheels including at least one driven wheel linked to a means for driving said wheel and operable to drive said frame, and a dirigible wheel for steering said frame relative to a seam of overlapped thermoplastic sheeting,
   a speed control selectively operable to adjust the drive speed of said frame along said seam,
   heater means for heating air,
   blower means for generating a stream of air,
   foot means on said frame for directing a stream of air generated by said blower means and heated by said heating means to between overlapped portions of the sheeting as said frame is driven, and
   a heater control including an operator adjustable to temperature control to set outlet temperature to different levels and including a temperature sensor extending directly into the stream of heated air in said foot means to directly sense the air temperature being applied to the thermoplastic sheeting, said heater control connected to vary the supply of thermal energy by said heater means as a function of said temperature independently of a rate of flow of the stream of air and independently of environmental temperature and independently of the speed of said frame relative to the seam,
   whereby said apparatus may be driven to continuously weld the seam throughout its length.

2. A seam welding apparatus as claimed in claim 1, wherein said foot means is a shaped nozzle foot insertable between the overlapped portions of the sheeting, said shaped nozzle foot having an end facing nozzle opening directed in a direction substantially opposite a driving direction of said frame, and
   wherein said temperature sensing means includes a thermocouple mounted in said shaped nozzle foot and extending into the stream of heated air.

3. A seam apparatus as claimed in claim 1, wherein there are three of said wheels rotatably mounted on said frame, and
   wherein said driving means drives two of said three wheels.

4. A seam welding apparatus as claimed in claim 3, wherein a third one of said three wheels is a dirigible caster.

5. A seam welding apparatus as claimed in claim 1, wherein said heater control means is a heat gun assembly pivotally mounted to said frame, said heat gun assembly including:
   a blower motor,
   an impeller connected to an output of said blower motor to generate a stream of air,
   a heating element downstream of said impeller to heat the stream of air, and
   wherein said foot means includes:
   a shaped nozzle foot having an end facing outlet opening for directing the heated stream of air between overlapped portions of sheeting;
   a plurality of air slots on upper and lower surfaces of said shaped nozzle foot upstream of said outlet opening for directing preheating air to the overlapped portions of said sheeting, and
   raised embossments on said nozzle foot forward of each each of said air slots relative to a driven direction of said frame to position the sheeting free of said slots.

6. A seam welding apparatus as claimed in claim 1, further comprising:
   a gimbal mounting said heat gun assembly to said frame and moveable in at least two planes so that said shaped nozzle foot is pivotable both vertically and laterally for placement between and removable from between the overlapped sheeting.

7. A seam welder as claimed in claim 6, further comprising:
   a foot rest on said frame for said shaped nozzle foot when in a non-operative position, said foot rest maintaining said nozzle foot spaced from the roofing sheets when non-operative, and
   means on said foot rest for adjusting and aligning said nozzle foot relative to said pressure roller wheel when said nozzle foot is moved to an operative position by pivotally raising said nozzle on said gimbal mounting.

8. A seam welding apparatus as claimed in claim 5, wherein said blower motor is a universal motor having brushes and further comprising:
   brush caps removably mounted on said blower motor to provide access to said brushes for selective replacement thereof.

9. A seam welding apparatus as claimed in claim 1, wherein said driving means includes a motor driving a helical spring clutch, said helical spring clutch having an output connected to drive said at least one wheel.

10. A seam welding apparatus as claimed in claim 1 wherein one of said plurality of wheels is a pressure roller wheel disposed to engagingly seal the overlapped portions of heated sheeting, and further comprising:
ballast support means for mounting weights to increase gravitationally increase downward force on said pressure roller wheel.

11. A seam welder for fastening overlapped thermoplastic sheets, comprising:
a rigid one piece frame;
first and second drive wheels connected by a drive axle and mounted on said frame, said first wheel being a pressure roller wheel for sealing overlapped portions of the sheets;
a third wheel assembly mounted on said frame and pivotable to redirect a rolling direction of said third wheel assembly relative to said frame;
a drive assembly including a drive motor on said frame connected to drive said first and second drive wheels to drive said seam welder in a forward direction;
a steering handle extending upwardly from said frame for manipulation to redirect a moving direction of said seam welder;
a heat gun assembly pivotable mounted on said frame for movement between an operating and a non-operating position, said heat gun assembly including means for generating a stream of air,
means for heating said stream of air to a predetermined temperature independently of said air stream generating means and,
means for directing said heated stream of air between overlapped portions of the thermoplastic sheets when in said operating position to form a heat welded seam;
said pressure roller wheel following said heated air directing means relative to the forward direction to seal the heat welded seam;
means for selectively adjusting spacing between said pressure roller wheel and said heated air directing means when in said operating position to provide a plurality of different working positions to accommodate different materials; and
control means connected to said heat gun assembly for controlling the heated air stream.

12. A seam welder as claimed in claim 11, wherein said drive assembly includes
a helical spring clutch connected between said drive motor and said first and second drive wheels, said helical spring clutch having inner and outer hubs selectively connectable by a helical spring.

13. A seam welder as claimed in claim 11, wherein said control means includes:
temperature sensing means in said means for directing heated air for sensing temperature of the heated air flow immediately before the heated air impinges the overlapped portions; and
a control circuit connected to said temperature sensing means and to said heating means to selectively supply power to said heating means to maintain a generally constant predetermined temperature of the heated air flow at said temperature sensing means during the traverse of the welder relative to the seam.

14. A seam welder as claimed in claim 13, further comprising:
a control instrument enclosure encasing said control circuit, said control instrument enclosure being connected to said heat gun assembly by quick-connect fittings, and
manual control means for selectively adjusting said predetermined temperature, said manual control means mounted on said control instrument enclosure.

15. A seam welder as claimed in claim 14, further comprising:
a drive motor control mounted in said control instrument enclosure and including a top mounted manually operable drive speed control knob for selectively adjusting the speed of the drive motor.

16. A roof seam welder as claimed in claim 11, further comprising:
a guide wheel assembly mounted on said frame, said guide wheel assembly including a guide wheel mounted to follow an edge of the overlapped roofing sheets.

17. A seam welder as claimed in claim 16, wherein said guide wheel assembly includes:
means for laterally adjusting said guide wheel relative to the forward direction, and
toggle means for selective positioning of said guide wheel in operable and non-operable positions.

18. A seam welder as claimed in claim 11, further comprising:
a gimbal mount connected between said frame and said heat gun assembly, said gimbal mount having a yoke and yoke shaft for movement of said heat gun assembly generally in a vertical plane and a yoke pivot shaft and a bushing for movement in a generally horizontal plane, and
a biased detent means operable between said yoke pivot shaft and said bushing for providing a predetermined detent position of said heat gun in the horizontal plane.

19. A seam welder as claimed in claim 11, wherein said heat gun assembly includes:
a blower housing having air inlets,
a blower motor mounted in said blower housing,
an impeller housing connected to said blower housing,
air impellers connected to an output shaft of of said blower motor to generate a flow of air from air drawn in through said air inlets,
a heater nozzle connected to said impeller housing,
a heating element assembly mounted within said heater nozzle downstream of said air impellers to heat the flow of air, and
a shaped nozzle foot extending from said heater nozzle downstream of said heating element assembly, said shaped nozzle foot having a generally flattened portion for extending between overlapped portions of the thermoplastic sheets, said shaped nozzle foot having at least one outlet opening to direct the heated air flow between the overlapped thermoplastic sheets.

20. A seam welder as claimed in claim 19, further comprising
thermal insulating material between said impeller housing and said heater nozzle and thermal insulating material between said heater nozzle and said heating element assembly.

* * * * *